Patented Apr. 19, 1938

2,114,689

UNITED STATES PATENT OFFICE 2,114,689

BITUMINOUS ROAD DRESSING

Arthur D. Smith, Park Ridge, Ill.

No Drawing. Application March 23, 1937,
Serial No. 132,623

7 Claims. (Cl. 106—31)

The invention relates to bituminous or asphaltic emulsions suitable for road dressings and particularly to the production of an emulsion adapted to consolidate relatively finely comminuted mineral aggregate and/or classified natural gravel with a coarser aggregate base or concrete substrata.

An important object of the invention is the achievement of an emulsion effective of such consolidation irrespective of any adsorbed and/or absorbed water respectively present on the surface or contained in the pores of the aggregate employed.

Another purpose of the invention is to provide for an emulsion operative at ordinary atmospheric temperatures without the necessity of preheating either the emulsion or aggregate.

A highly important object of the invention is to produce such emulsion as a balanced system of an order of dispersion approaching homogeneity, stable to normal climatic changes, but readily reversible as to phases upon contact with the aggregate to be consolidated.

In order to produce a highly dispersed emulsion it has been proposed to incorporate a relatively large quantity of water in a bituminous road dressing, but such type has the obvious objection of requiring a disproportionately large quantity of the dressing to obtain a final bitumen deposit of practical thickness to say nothing of handling an undue amount of inert material.

Another known method of preparing a bituminous emulsion involves the use of an aqueous solution of a fatty acid soap as the emulsifier and the inversion of the dispersed phase of the mixture before application thereof to the aggregate.

The present invention comprehends broadly the production of a bituminous or asphaltic emulsion with an aqueous solution of an alicyclic and/or aromatic acid soap as the emulsifier, the establishment of a delicately balanced equilibrium between the dispersed phases involved before application of the emulsion to the aggregate to be consolidated, and the final substantially simultaneous inversion and breaking of the emulsion through adsorptive or catalytic contact with the said aggregate with the latter preferably in situ.

In preparing such emulsion the viscosity of the bituminous or asphalt base is reduced or thinned to a practical consistency with a naphtha diluent of the general characteristics of the well-known varnish and paint makers' grade; the exact quantity of naphtha necessary depending on the initial penetration and/or viscosity of the base or flux employed and in general amounting with a 90 penetration asphalt to say, 30–50% by weight of such base.

The thus thinned bitumen or asphalt base is gradually introduced under constant stirring, preferably in a crutcher or agitator provided with revolving paddles or the like, into an approximately 5% aqueous solution of the above mentioned alicyclic and/or aromatic acid soap, in the proportion of say 65–85% of the naphtha thinned base to 35–15% of the aqueous solution, the agitation being continued until apparent homogeneity is obtained. Both this step and the immediately preceding may be advantageously carried out at a gentle heat to hasten the process.

The term alicyclic and/or aromatic acid soap as here employed comprehends the water soluble and/or substantially water soluble compounds resulting from the apparent saponification by the alkali metal hydrates (including ammonia and water soluble amines) of the alicyclic and/or aromatic oils derived by the distillation of the natural gums or resins of terpene base of which the sodium salt of the non-fatty abietic acid (diterpene carboxylic acid) may be considered as typical, although in addition to such salt, soaps of the above nature contain a substantial percentage of complex aromatic impurities which apparently are an aid to emulsification. On account of its ready availability and cheapness I prefer to use as the oil base for the production of a soap of the class above described the so-called rosin oil of commerce, such oil containing as its principal constituent abietic anhydride ($C_{44}H_{26}O_4$) and further being readily saponifiable in the cold. In actual practice I saponify the oil with caustic soda solution as required, it being understood that the use of the terms "soap" and "saponify" are here employed in their popular technical sense, as I am aware that there is a considerable difference of opinion as to whether rosin oil "soap" is a true soap in the strictest chemical meaning.

After effecting emulsification as above described, the next step of the process involves rendering the dispersoid (at this stage the bitumen) in a state of equilibrium approaching instability so that upon subsequent application of the emulsion to the aggregate, the water becomes the dispersoid substantially simultaneously upon contact with such aggregate. This balanced stability or dynamic equilibrium is effected by adding to the emulsion a polyhydric alcohol such as glycerine or ethylene glycol, preferably the latter on account of its cheapness, in quantity sufficient to substantially hydrolyze the abietic acid soap, the acid proper attaching itself to the 1, 2 hydroxyl groups of the glycol. Where the water employed as the soap solvent contains an appreciable content of lime a sufficient percentage of borax may be added to overcome this feature. Any slight excess of borax initially advantageous in producing the emulsion may be reduced to an acid reaction by the same above mentioned ethylene glycol, the latter being the determining factor in producing a balance of dispersed systems. The subsequent destruction of equilibrium with transposition of the dispersoid occurring substantially simultaneously upon contact with the aggregate, I attribute to adsorptive and/or catalytic phenomena, but the accuracy of such theory is not guaranteed. Irrespective however of what inverse forces are involved upon contact, the fact remains that the emulsion as above produced and applied, assumes a condition where it may be readily poured, spread and generally worked with hand tools or be subjected to compaction under heavy compression by power driven apparatus. The delay of phase change until contact is made with the aggregate insures a mobility sufficiently prolonged to admit of the filling of all voids and interstices and but very slightly delaying the eventual expression of water and evaporation of solvent; the final consolidated product representing the optimum in bond and being in effect integral in composition.

In the practical application of the invention it will be obvious to one skilled in the art that considerable latitude must obtain in preparing the emulsion in question. Thus, on account of its greater solvent action on bitumen, less naphtha of naphthenic and/or aromatic origin will be required than if of substantially paraffinic nature. Rosin oil varies considerably in its saponification number according to the terpene source; i. e., whether of American or foreign origin, this in turn influencing the amount of ethylene glycol required to establish the dispersed system in the proper dynamic balance, so that no hard and fast rule as to exact proportions of the ingredients entering into the emulsion can be stated. The quantities mentioned are given by way of example only and represent amounts required for average conditions encountered in the industry. Variation of procedure will doubtless occur to those skilled in the art without departing from the spirit of the invention and what I claim as new and desire to protect by Letters Patent is:

1. The process of preparing a bituminous road dressing which comprises incorporating a mobile bitumen with an aqueous solution of an alicyclic acid soap to form an emulsion, reducing such emulsion to an equilibrium approaching instability through the addition thereto of a polyhydric alcohol, applying the resultant mixture to a mineral aggregate and effecting upon such contact inversion of the bituminous phase originally existent in said emulsion.

2. The process of preparing a bituminous road dressing which comprises incorporating a mobile bitumen into an aqueous solution of a terpene carboxylic acid soap to form an emulsion, reducing such emulsion to an equilibrium approaching instability through the addition thereto of a polyhydric alcohol, applying the resultant mixture to a mineral aggregate and effecting upon such contact inversion of the bituminous phase originally existent in said emulsion.

3. The process of preparing a bituminous road dressing which comprises incorporating a mobile bitumen with an aqueous solution of alicyclic acid soap containing sodium abieticate as its major ingredient to form an emulsion, reducing such emulsion to an equilibrium approaching instability through the addition thereto of a polyhydric alcohol, applying the resultant mixture to a mineral aggregate and effecting upon such contact inversion of the bituminous phase originally existent in said emulsion.

4. The process of preparing a bituminous road dressing which comprises incorporating a mobile bitumen with an aqueous solution of a rosin oil soap to form an emulsion, reducing such emulsion to an equilibrium approaching instability through the addition thereto of a polyhydric alcohol, applying the resultant mixture to a mineral aggregate and effecting upon such contact inversion of the bituminous phase originally existent in said emulsion.

5. The process of preparing a bituminous road dressing which comprises incorporating a mobile bitumen with a relatively weak aqueous solution of a rosin oil soap to form an emulsion, reducing such emulsion to an equilibrium approaching instability through the addition thereto of a relatively small quantity of polyhydric alcohol such as ethylene glycol, applying the resultant mixture to a mineral aggregate and effecting upon such contact inversion of the bituminous phase originally existent in the emulsion.

6. The process of preparing a bituminous road dressing which comprises thinning a bitumen with naphtha to a mobile fluidity, incorporating the bitumen so thinned with a relatively small quantity of a weak aqueous rosin oil soap solution to form an emulsion, reducing such emulsion to an equilibrium approaching instability through the addition of a relatively small quantity of ethylene glycol effective of the hydrolysis of said soap, applying the resultant mixture to a mineral aggregate and effecting upon such contact inversion of the bituminous phase originally existent in the emulsion.

7. The process of preparing a bituminous road dressing which comprises thinning a bitumen with naphtha to a mobile fluidity, incorporating the bitumen so thinned with relatively small quantities of weak aqueous rosin oil soap and sodium borate solutions to form an emulsion, reducing such emulsion to an equilibrium approaching instability through the addition of a relatively small quantity of ethylene glycol sufficient to hydrolyze said soap and borate solutions, applying the resultant mixture to a mineral aggregate and effecting upon such contact inversion of the bituminous phase originally existent in the emulsion.

ARTHUR D. SMITH.